July 26, 1927.
E. BUGATTI
1,636,898
TOOL HOLDER FOR CUTTING OFF PIECES OF WORK
Filed Jan. 8, 1925
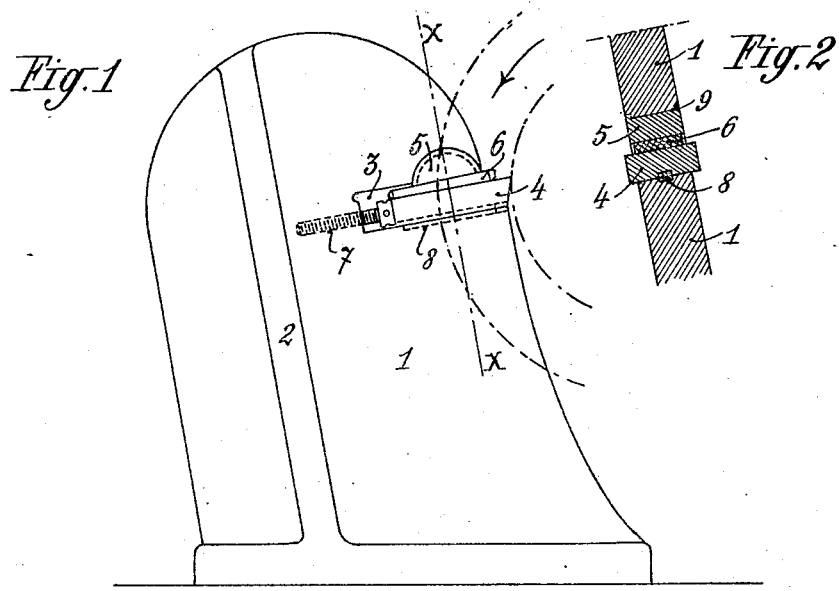
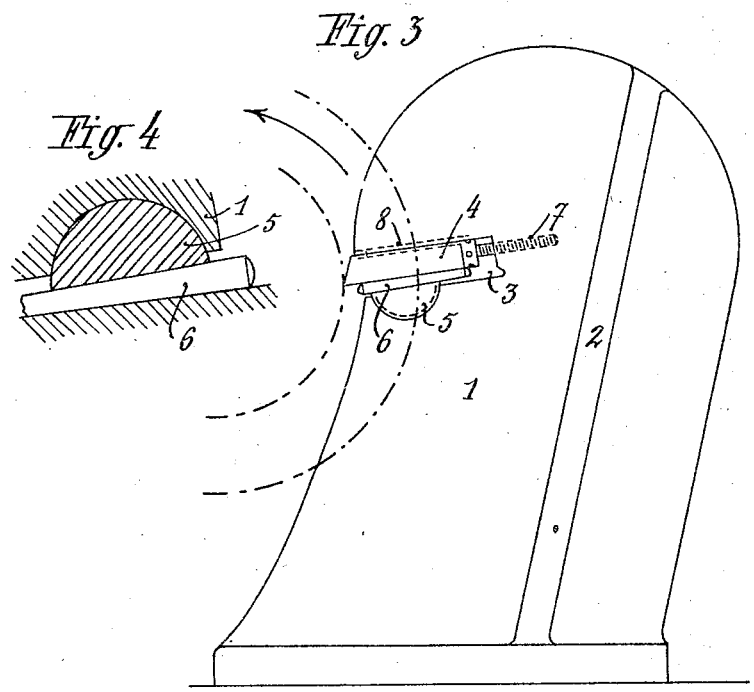

Patented July 26, 1927.

1,636,898

UNITED STATES PATENT OFFICE.

ETTORE BUGATTI, OF MOLSHEIM, FRANCE.

TOOL HOLDER FOR CUTTING OFF PIECES OF WORK.

Application filed January 8, 1925, Serial No. 1,263, and in France April 14, 1924.

In current practice, pieces of work of large size are cut into sections upon the lathe, or are grooved in any suitable manner by the tool, but this operation is lacking in accuracy and is also attended with a considerable expense with the known arrangements of the tool. In fact, the tool must be given a certain height in order to obviate all flexion, but such tools are subject to lateral vibrations which produce the well-known chattering effect, which is obviously of a prejudicial nature.

The present invention relates to a tool holder of large size which is adapted for cutting the work into sections and is so constructed as to obviate all jarring, said tool holder supporting a steel tool having the width of the section which is to be cut from the piece of work.

The following description with reference to the appended drawings which are given by way of example sets forth the said invention.

Fig. 1 is a side elevation of the front part of the tool holder.

Fig. 2 is a section on the line X—X of Fig. 1.

Fig. 3 is a side view of a tool holder, the parts being in the reverse position to that of Fig. 1.

Fig. 4 is a detail view showing the method of maintaining the tool.

The tool holder 1 consists of an element made of cast or forged steel and of suitable shape, whose thickness (Fig. 2) is less than that of the tool 4, comprising the ribs 2 affording the proper lateral rigidity. In the said element is formed a rectangular slot 3 in which is disposed the tool 4 as well as the members maintaining it in place.

At the upper or lower part of the said slot (according as a front or rear tool-holder is employed), a semicircular recess is provided, by the milling process, co-operating with a semi-cylindrical member 5; the flat surface of said member is placed in contact with one face of a tapered key 6 whereof the other face is in contact with the tool 4. The said key is inserted by tight friction, and hence the tool will be held in place in an approved manner.

In order to prevent the tool from moving towards the interior, an adjusting screw 7 is screwed into the inner end of the slot 3, the head of the said screw being in contact with the rear end of the tool 4.

To prevent the lateral motion of the tool, a rectangular key 8 is disposed half in the tool 4 and half in the tool-holder 1, Fig. 2. The semi-cylindrical member 5 comprises one or two cheeks 9 disposed in suitable grooves formed in the semicircular recess in the main frame of the tool holder.

It is observed that the said tool will not be subjected to vibrations or jarring, since the tool is supported in the tool holder upon its whole length. The adjustment can be performed with facility should it be desired to provide for a certain stroke relative to a groove of a given depth, as shown in the dot and dash lines. The arrow shows the direction of rotation of the piece.

Fig. 3 represents a tool holder as hereinbefore set forth, but in this case the tool is in the inclined position towards the work, and is so disposed as to operate at the rear of the tool holding element.

What I claim is:

A tool holder for cutting circular grooves comprising a main frame or base whose thickness is less than the width of the tool, transverse ribs for strengthening the said frame, a recess or slot formed in the said frame, a semi-cylindrical recess formed on one face of said slot, a semi-cylindrical member co-operating therewith, a key having a trapezoidal profile interposed between said semi-cylindrical member and the tool which is disposed in the said recess formed in the main frame, a rectangular key whereof one half enters the face of the tool and the other half enters the main frame, and a screw disposed in the inner end of the said recess in the main frame and forming a support for the end of the said tool.

In testimony whereof I have signed this specification.

ETTORE BUGATTI.